United States Patent
Filipczak et al.

(10) Patent No.: US 8,507,075 B2
(45) Date of Patent: *Aug. 13, 2013

(54) ADHESION METHOD FOR ATTACHING BARRIER SHEETS TO MOTOR VEHICLE DOOR PANELS

(75) Inventors: Larry A. Filipczak, West Bloomfield, MI (US); Brian R. Rusch, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1597 days.

This patent is subject to a terminal disclaimer.

(21) Appl. No.: 12/022,386

(22) Filed: Jan. 30, 2008

(65) Prior Publication Data

US 2009/0191379 A1  Jul. 30, 2009

(51) Int. Cl.
*B32B 37/02* (2006.01)
*B32B 7/12* (2006.01)

(52) U.S. Cl.
USPC ........ 428/194; 428/156; 428/195.1; 428/198; 428/192; 428/343; 296/146.7; 296/39.1; 156/64

(58) Field of Classification Search
USPC .............. 428/156, 195.1, 198, 192, 343, 194; 296/146.7, 39.1; 156/64
See application file for complete search history.

(56) References Cited

U.S. PATENT DOCUMENTS

| | | | |
|---|---|---|---|
| 4,588,627 A * | 5/1986 | Isaksen et al. | 428/80 |
| 4,844,004 A * | 7/1989 | Hadzimihalis et al. | 118/315 |
| 6,368,409 B1 | 4/2002 | Borsuk et al. | |
| 6,491,974 B1 * | 12/2002 | Gordon | 427/207.1 |
| 7,670,671 B2 * | 3/2010 | Russell et al. | 428/172 |
| 7,784,851 B2 * | 8/2010 | Filipczak et al. | 296/146.1 |

FOREIGN PATENT DOCUMENTS

| | | |
|---|---|---|
| DE | 69400923 T2 | 6/1997 |
| DE | 10033768 A1 | 1/2001 |
| DE | 69608577 T2 | 1/2001 |
| DE | 102005011075 A1 | 9/2006 |
| EP | 0892026 A2 | 1/1999 |
| WO | WO0208003 A1 | 1/2002 |

OTHER PUBLICATIONS

German Office Action dated Mar. 23, 2010 for German patent application 102009006295.5 corresponding to U.S. Appl. No. 12/022,386.
U.S. Appl. No. 11/748,067, filed May 14, 2007 to inventors Larry A. Filipczak, Brian R. Rusch, and Luigi R. Magnanti.
Series H-200 "Mini-Bead Gun" product sheet (2 pgs.) of Nordson Corporation, Duluth, GA 30097, sheet PKL-95-720 reissued on Jun. 1999.
FoamMelt 200 Adhesive Applicator product sheet (2 pgs.) of Nordson Corporation, Duluth, GA 30097, sheet PAL-00-1781 revised Feb. 2003.
"Run Circles Around Other Method of Product Assembly" information sheet (4 pgs.) for FoamMelt Process of Nordson Corporation, Duluth, GA 3009, sheet 306-18-778-I dated Dec. 1989.

* cited by examiner

*Primary Examiner* — William P Watkins, III

(57) ABSTRACT

A methodology for adhesively attaching a barrier sheet to a motor vehicle inside door panel. A plurality of adhesive beds are disposed on the attachment face of a barrier sheet, whereby pressure applied to the barrier sheet causes the adhesive beads to wet-out with respect to the door inside panel and mergingly wet-out with respect to each other so as to thereby form an adhesive band. Visual inspection of the continuity of the merged wet-out through the barrier sheet provides installer feedback regarding installation integrity.

15 Claims, 6 Drawing Sheets

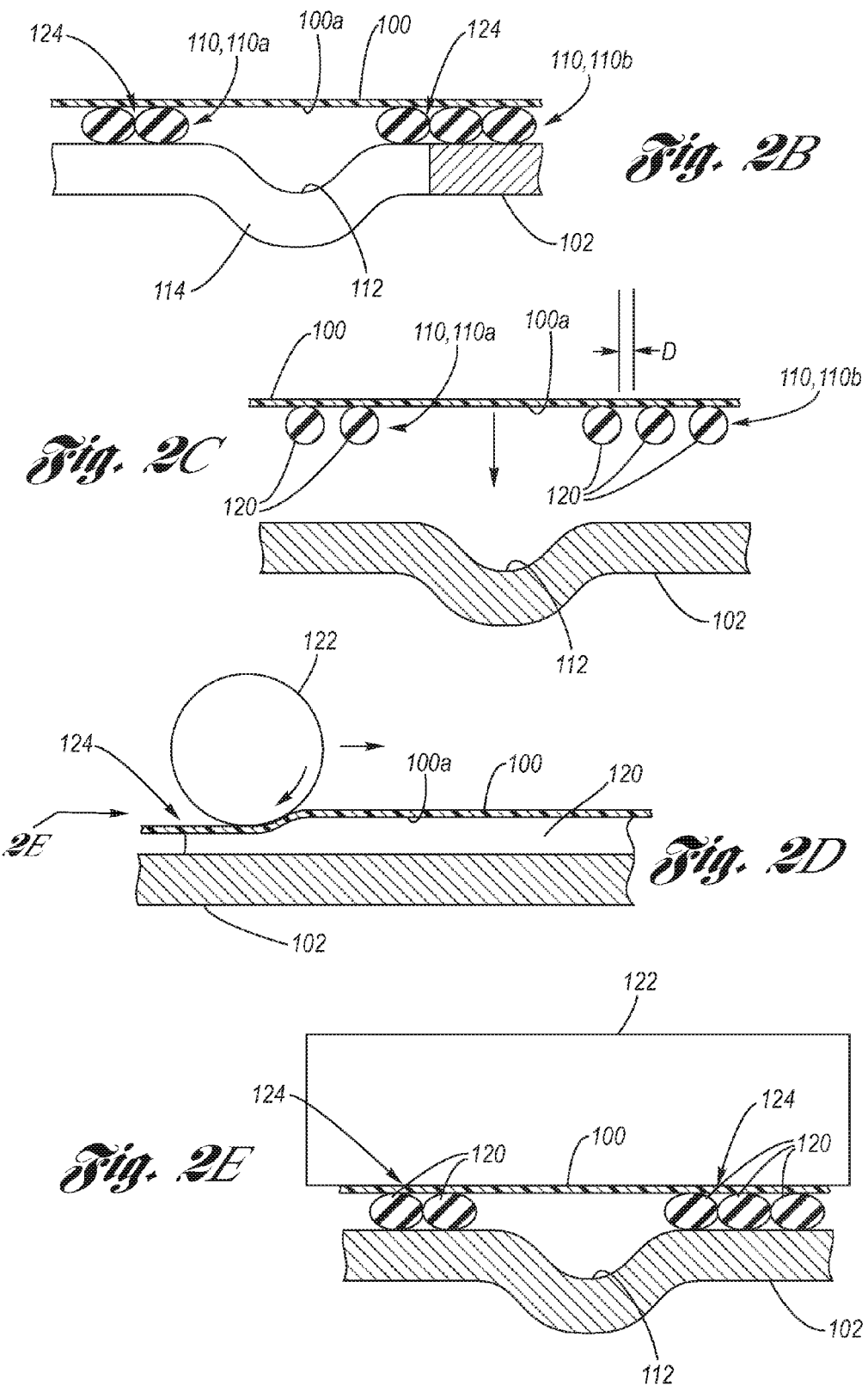

ADHESION METHOD FOR ATTACHING BARRIER SHEETS TO MOTOR VEHICLE DOOR PANELS

TECHNICAL FIELD

The present invention relates to barrier sheets which are adhesively applied to the inside door panel of motor vehicles, which barrier sheets may serve as a barrier for example to any of water or noise and may further serve to dampen vibration. More particularly, the present invention relates to an adhesive methodology which serves to ensure integrity of the seal between the inside door panel and the barrier sheet.

BACKGROUND OF THE INVENTION

Motor vehicle doors are provided with inside door panels, often, but not necessarily, composed of sheet metal, which include access openings to facilitate installation and servicing of parts within the door, as for example door lock mechanisms, window actuators, audio components, etc. Since rain and splash water can ingress to the interior of the door through a number of locations, as for example where the door window emerges from the door interior, it is necessary to seal these openings as between the inside door panel and the interior trim of the door in order to prevent water seepage into the passenger compartment of the motor vehicle. It is, therefore, common practice to adhesively secure a barrier sheet to the door inside panel which sealingly covers one or more of its openings.

The barrier sheets (otherwise known as "water deflectors" or "acoustic barriers") utilized in the present art are typically a continuous, flexible plastic sheet material having an optical range between clear and opaque, and a material range between a very thin sheet for providing a water barrier to a thick sheet for providing acoustic attenuation and/or vibration damping. Typical materials can include polyethylene, polypropylene, filled polyethylene, modified polypropylene, etc. In some instances, two layers of barrier sheets may be used, for example a first, thinner layer serving to prevent water passage and another, thicker second layer sitting atop the first layer, serving to provide vibration damping and/or acoustic attenuation.

An example of a typical prior art methodology for providing a barrier sheet 10 on an inside panel 12 of a motor vehicle door 14 is depicted at FIGS. 1A through 1D.

At FIGS. 1A through 1C, it will be seen that the inside panel 12 has at least one opening 16 (three openings 16 being shown merely by way of example). The barrier sheet 10 is dimensioned to extend across the openings 16 and to generously overlap onto the generally adjacent, and suitable panel surfaces 12a, as per a predetermined perimeter 18 of the barrier sheet 10. Located within and proximate to the perimeter 18 is disposed a single adhesive bead 20 which locally parallels, more or less, generally the entire perimeter 18. The adhesive bead 20 is sealingly adhered to the inside door panel 12 at one side thereof and an attachment face 10a of the barrier sheet 10 at the diametrically opposite side thereof.

It will be seen, therefore, that if the adhesive seal everywhere has integrity, then water will be sealed from entry into the passenger compartment of the motor vehicle. In order to provide water management, a drain hole 22 is provided at each gravitationally low spot of the adhesive bead 20 (a single drain hole 22 being shown merely by example), whereby water can run along the adhesive bead 20 and then out the drain hole into the door interior and then out the conventional bottom door drain. However, it will be noticed at FIG. 1B, that the adhesive bead 20 must run gravitationally below the drain hole 22, whereby a pocket 24 is present which can retain therein water.

The prior art barrier sheet adhesion process will next be discussed.

Initially the barrier sheet is fabricated, and then placed into an applicator apparatus. The applicator apparatus includes a reservoir for holding a hot melt adhesive which is selectively foamed, as for example by addition of nitrogen gas of between 0% and about 50% to the adhesive (unfoamed adhesive being when nitrogen addition is 0%). The barrier sheet rests upon a table and an applicator head of the applicator apparatus utilizes a nozzle which squeezingly applies a hot melt adhesive bead onto the barrier sheet inside of and proximate to the perimeter thereof. A typical adhesive bead is about 5 mm in diameter.

At an assembly plant, the barrier sheet is aligned with the inside door panel 12 and with the attachment face 10a of the barrier sheet having adhesive bead 20 facing toward the inside door panel, the adhesive bead is pressed against the inside door panel to marry the barrier sheet to the inside door panel. As shown at FIG. 1D, a roller 26 is then rolled along the periphery to cause the adhesive bead along its length to be squeezingly brought into intimate surface-to-surface sealing contact (referred to in the art as "wet-out") with the inside door panel. The adhesive bead of the barrier sheet is such that when applied to a surface to which it has wet-out contact, the barrier sheet may be peeled off the surface, and the adhesive bead may be again be re-adhered to the surface in a wet-out relation thereto.

Problematically with the adhesion method for barrier sheets in the prior art, an installer has no certain way of knowing (i.e., feedback) whether or not the adhesive bead has achieved fully sealed status (that is, wet-out with the door inside panel) along its entire length, wherein any small void may allow water to leak into the passenger compartment.

Thus, what remains needed in the art is an adhesion methodology for barrier sheets which provides installer feedback as to whether wet-out has been achieved, and further a redundancy of adhesion which provides sealing even if a partial failure of the adhesion occurs.

SUMMARY OF THE INVENTION

The present invention is a methodology for adhesively attaching a barrier sheet to a motor vehicle inside door panel, wherein installation feedback is provided to the installer indicative of whether or not wet-out has been achieved, and further a redundancy of adhesive beads provides merged wet-out which is effective as a water seal even if a partial failure of the adhesion occurs.

A plurality of adhesive beads are disposed on the attachment face of a barrier sheet in a predetermined disposition so as to sealingly attach the barrier sheet to the inside door panel such that one or more openings of the inside door panel are sealingly covered by the barrier sheet. The adhesive beads are arranged in the form of at least one adhesive bead set, each adhesive bead set being composed of a plurality of adhesive beads in mutually parallel relation to each other, and mutually spaced apart a predetermined distance such that when an installer applies pressure to the outer face of the barrier sheet so as to thereby press upon the adhesive beads, as the adhesive beads wet-out, they expand toward each other and wet-out with respect to each other, thereby forming an adhesive band which is wet-out on the inside door panel.

The present invention provides feedback to an installer that wet-out has occurred in response to pressure application over the at least one adhesive bead set, as for example by a roller. Where a transparent barrier sheet is used which allows the installer to see the adhesive beads therethrough, the installer is able to see whether or not wet-out merger of adjacent adhesive beads has occurred. By quick, easy visual inspection, the installer is able to spot any location where the adjacent adhesive beads may not have mutually merged in wet-out with respect to each other, and in any such location re-apply overlying pressure to secure wet-out merger between the adjacent adhesive beads. However, even if for some reason wet-out was not, or later is not, achieved by a portion of the adhesive beads, the remaining adhesive beads having wet-out will provide a water tight seal thereat.

At least one adhesive bead set is provided, each adhesive bead set having a number of adhesive beads ranging from at least two adhesive beads to six or more.

In one preferred from of the present invention, a single adhesive bead set is provided. This would be used, for example, in situations where there is present no door panel trough (as explained momentarily).

In another preferred form of the present invention, two adhesive bead sets are provided, in mutually parallel alignment, straddling a door panel trough, wherein the door panel trough is as described in U.S. Ser. No. 11/748,067, filed on May 14, 2007 to inventors Larry A. Filipczak, Brian R. Rusch, and Luigi R. Magnanti, and assigned to the assignee hereof, the disclosure of which is hereby herein incorporated in its entirety be reference. An inner adhesive bead set is disposed on the side of a door panel trough closest the at least one opening, and an outer adhesive bead set is disposed on the opposite side of the door panel trough (closest the perimeter of the barrier sheet). In the event the inner adhesive bead set has a failure of wet-out, the wet-out failed area will form a capillary which will allow water to enter the door panel trough and then will drain through an interfacing drain hole of the inside door panel, wherein the outer adhesive bead set will maintain water seal integrity thereat.

Accordingly, it is an object of the present invention to provide a methodology for adhesively attaching a barrier sheet to a motor vehicle inside door panel, wherein installation feedback is provided to the installer indicative of whether or not wet-out has been achieved, and further a redundancy of adhesive beads provides merged wet-out which is effective as a water seal even if a partial failure of the adhesion occurs This and additional objects, features and advantages of the present invention will become clearer from the following specification of a preferred embodiment.

BRIEF DESCRIPTION OF THE DRAWINGS

FIG. 2B is a cross-sectional view, seen along line 2B-2B of FIG. 2A.

FIG. 2C is a cross-sectional view of a barrier sheet having adhesive bead sets attached thereto, ready for installation onto an inside door panel having a door panel trough.

FIG. 2D is a partly cross-sectional side view of an installation process for attaching the barrier sheet of FIG. 2C to a door inside panel.

FIG. 2E is a partly cross-sectional view, seen along arrow 2E of FIG. 2D.

DESCRIPTION OF THE PREFERRED EMBODIMENT

Figure 1A:
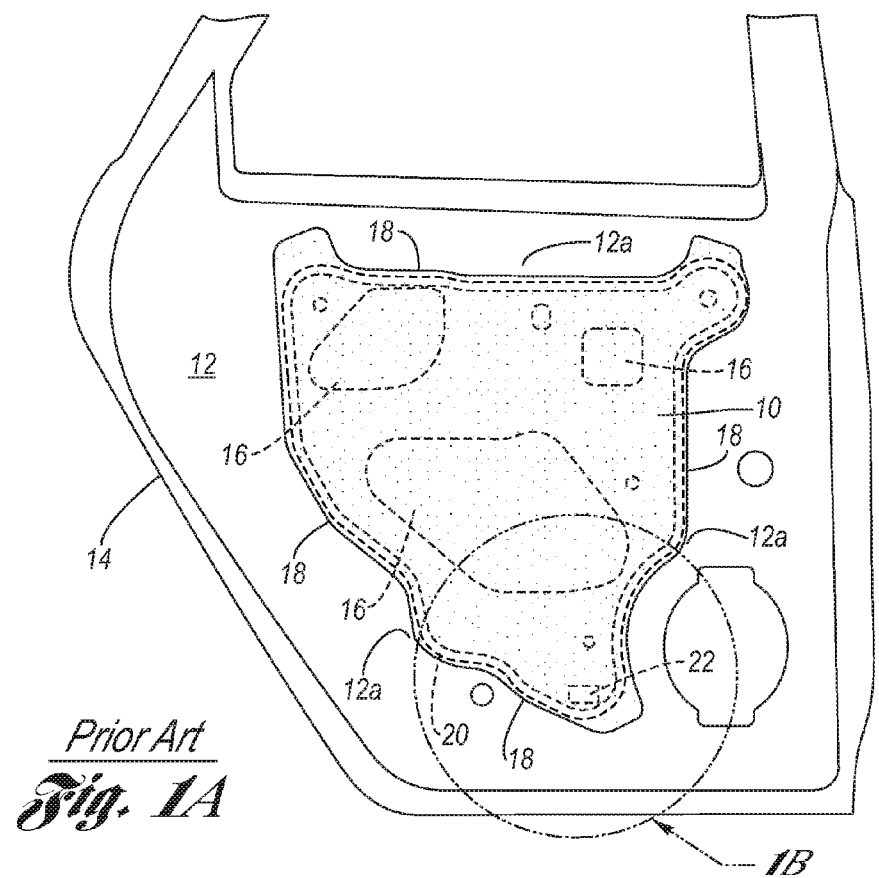
FIG. 1A is a side plan view of a door inside panel, showing a plurality of openings formed therein, a barrier sheet covering the openings, and a prior art adhesive bead attaching the barrier sheet to the door inside panel.
Figure 1B:
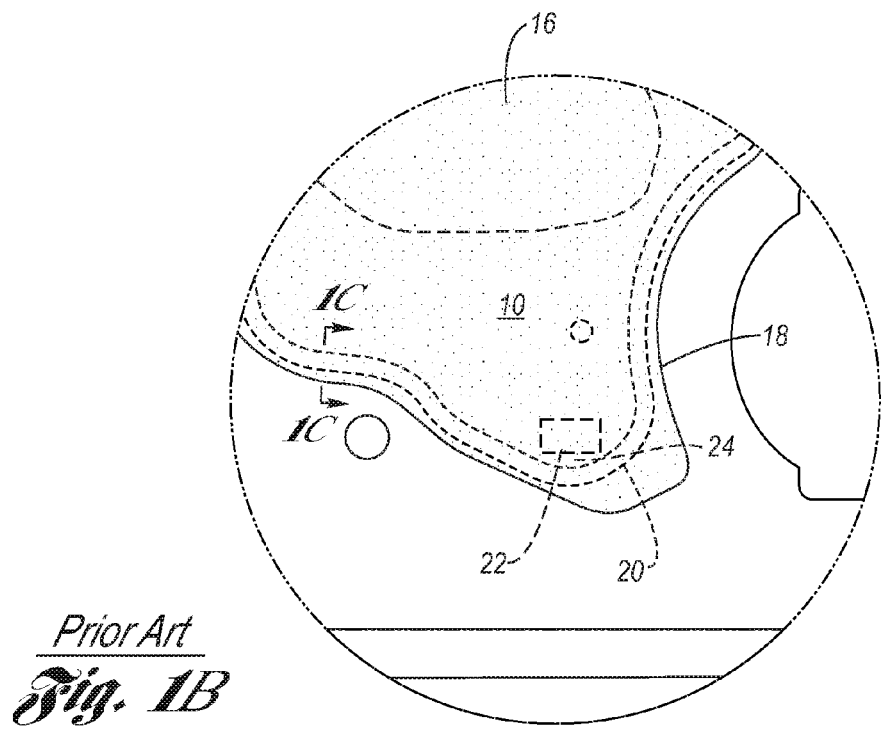
FIG. 1B is a detail view, seen at circle 1B of FIG. 1A, showing the spaced relation between the prior art drain hole of the door inside panel and the prior art adhesive bead.
Figure 1C:
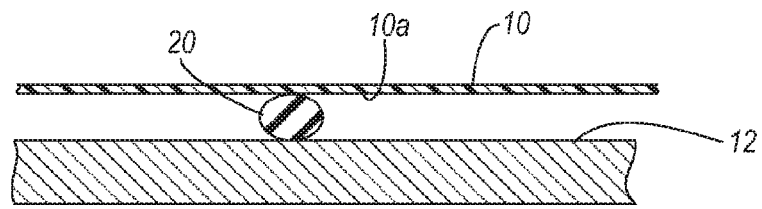
FIG. 1C is a cross-sectional view, seen along line 1C-1C of FIG. 1B.
Figure 1D:
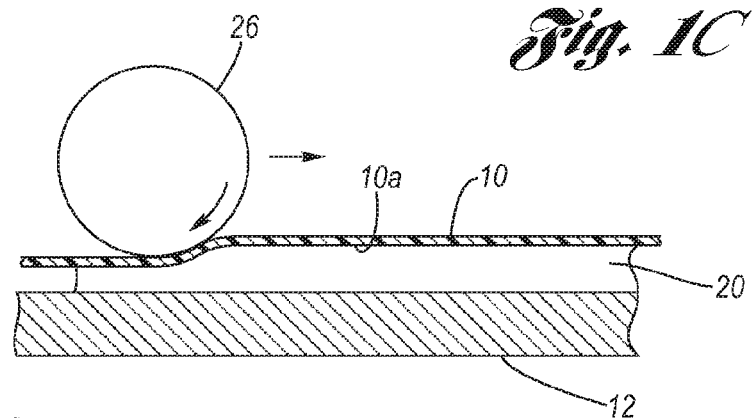
FIG. 1D is a partly cross-sectional side view of an installation process for attaching a barrier sheet to a door inside panel, utilizing the prior art adhesive bead of FIG. 1A.

Referring now to the Drawing, FIGS. 2 through 5 depict various aspects of the structure and methodology according to the present invention for attaching a barrier sheet to an inside door panel via utilization of one or more adhesive bead sets in accordance with the present invention.

Figure 2A:
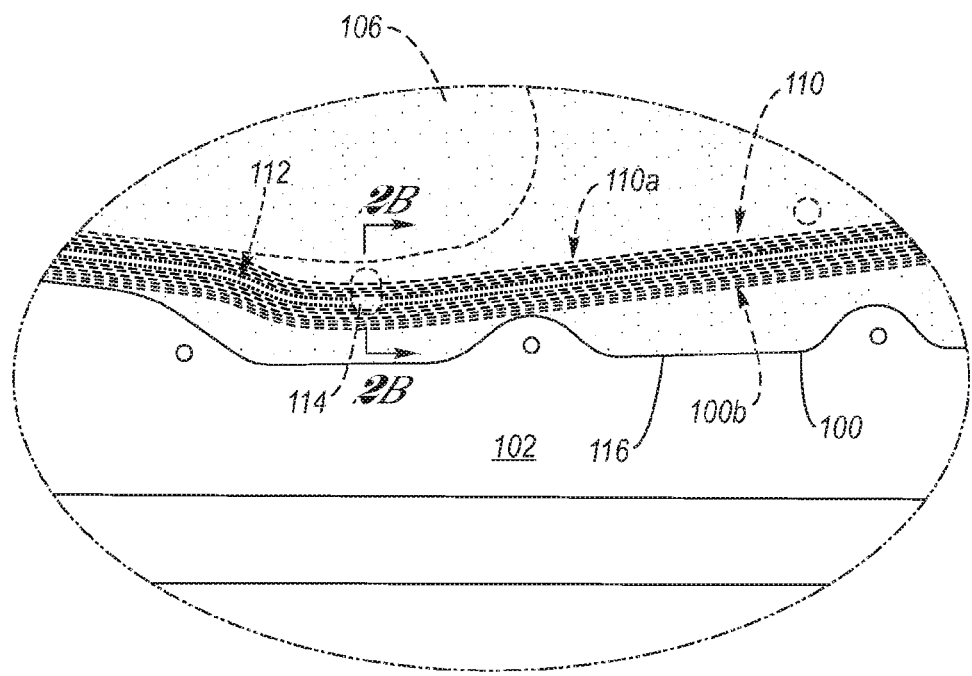
FIG. 2A is a detail view, seen at circle 2A of FIG. 2, showing the intersecting relation between the drain hole of the door inside panel, the door panel trough, and the adhesive bead sets according to the present invention.
Figure 2:
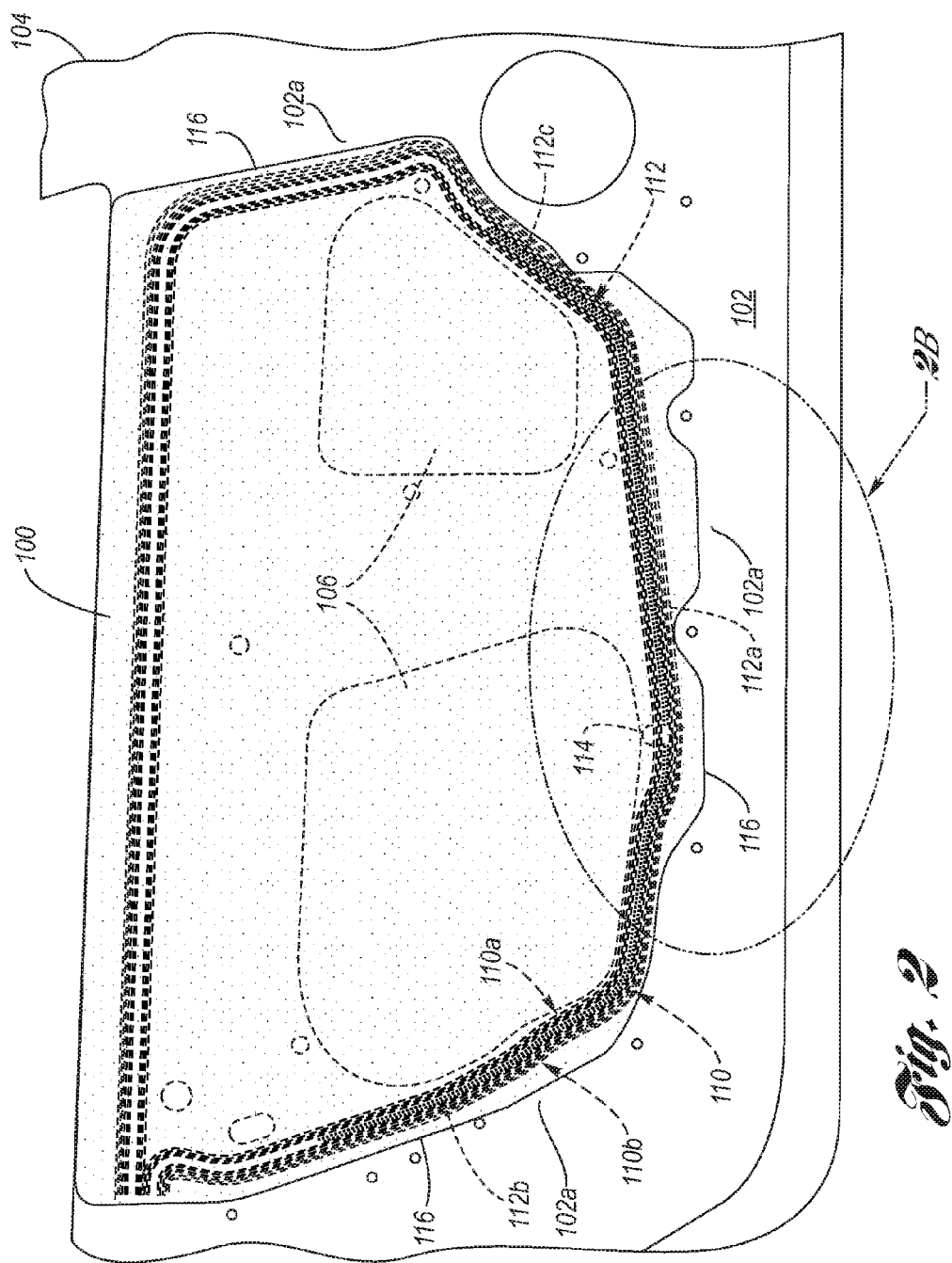
FIG. 2 is a side plan view of a door inside panel, showing a plurality of openings formed therein, a barrier sheet covering the openings, a door panel trough, and adhesive bead sets according to the present invention straddling the door panel trough and attaching the barrier sheet to the door inside panel.

Turning attention firstly to FIGS. 2 through 2E, a barrier sheet 100 is shown installed on an inside door panel 102 of a motor vehicle door 104. It will be seen that the barrier sheet 100 overlappingly covers one or more openings 106 (two openings 106 being shown merely by way of exemplification, as there can be any number of openings covered by the barrier sheet). The barrier sheet 100 is adhesively attached in wet-out relation to the inside door panel 102 via at least one adhesive bead set (two adhesive bead sets being depicted) 110 according to the present invention.

The barrier sheet 100 is dimensioned to extend across the openings 106 and to generously overlap onto the generally adjacent, and suitable panel surfaces 102*a*, as per a predetermined perimeter 116 of the barrier sheet 100. Located within and proximate to the perimeter 116 is disposed the adhesive bead sets 110 which locally parallel, more or less, generally the entire perimeter 116.

The barrier sheet 100 may be a conventional, continuous, flexible plastic sheet material having an optical range between clear and opaque (transparent being utilized per a form of the method of the present invention to be detailed hereinbelow), and a material range between a very thin sheet for providing a water barrier to a thick sheet for providing acoustic attenuation and/or vibration damping. Typical materials can include polyethylene, polypropylene, filled polyethylene, modified polypropylene, etc. In some instances, two layers of barrier sheets may be used, for example a first, thinner layer serving to prevent water passage, and another, thicker second layer sitting atop the first layer, serving to provide vibration damping and/or acoustic attenuation, wherein the method of the present invention pertains to the adhesive attachment of the barrier sheet (in whatever form) to the inside door panel.

In the preferred embodiment shown at FIGS. 2 through 2E, it is contemplated that the barrier sheet 100 (see FIG. 2C) will be applied to an inside door panel 102 which has been previously provided with a door panel trough 112. The door panel trough 112 is described in detail in the aforesaid U.S. Ser. No. 11/748,067, filed on May 14, 2007, to Filipczak et al, the disclosure of which having been incorporated, in its entirety, herein by reference hereinabove. The door panel trough 112 is in the form of an elongated indentation toward the inner door cavity, and preferably runs in a general U-shape including a lowermost trough portion 112a which interfaces with left and right upwardly ascending trough portions 112b, 112c. At least one drain hole 114 intersects the door panel trough 112, each drain hole being located at a respectively gravitationally lowest location of the lowermost trough portion 112a, whereby any water flow channeling along the door panel trough will empty into the at least one drain hole, and then exit the door 104 through its conventional bottom door drain holes (not shown).

The adhesive bead sets 110 are each composed of at least two adhesive beads 120 disposed on the attachment face 100a of the barrier sheet 100 in a predetermined disposition so as to sealingly attach the barrier sheet to the inside door panel 102 such that one or more openings 106 of the inside door panel are sealingly covered by the barrier sheet. The adhesive bead sets 110 and the door panel trough 112 have an intersecting relation with the at least one panel drain 114, as shown best at FIG. 2A. Each adhesive bead 120 is sealingly adhered to the inside door panel 102 at one side thereof and an attachment face 100a of the barrier sheet 100 at the diametrically opposite side thereof.

In a preferred embodiment of the present invention shown at FIGS. 2 through 2E, the adhesive beads sets 110 are composed of an inner adhesive bead set 110a disposed on the side of a door panel trough 112 closest to the at least one opening 106, and an outer adhesive bead set 110b disposed on the opposite side of the door panel trough (closest to the perimeter 116). By way of exemplification, the inner adhesive bead set 110a has two mutually parallel adhesive beads 120, and the outer adhesive bead set 110b has three mutually parallel adhesive beads 120.

As shown at FIGS. 2C through 2E, the adhesive beads 120 are arranged in mutually parallel relation to each other, and mutually spaced apart a predetermined distance D such that when an installer applies pressure to the outer face 100b of the barrier sheet 100, pressing upon the adhesive beads 120, as for example via a roller 122, the adhesive beads wet-out: they expand toward each other and wet-out with respect to each other (see FIGS. 2D and 2E), thereby forming an adhesive band 124, which is also wet-out on the inside door panel 102. In the event there is an untoward adhesive failure of the inner adhesive bead set 110a, the wet-out failed area thereof will form a capillary which will allow water to enter the door panel trough 112 and thereupon run out through a drain hole 114, wherein the outer adhesive bead set 110b will maintain water seal integrity of the barrier sheet 100.

In accordance with another aspect of the present invention, feedback to an installer that wet-out of the adhesive beads 120 has occurred in response to pressure application over the at least one adhesive bead set 110a, 110b, as for example by the above mentioned roller 122. Where a transparent barrier sheet 100 is used which allows the installer to see the adhesive beads therethrough, the installer is able to see whether or not wet-out merger of adjacent adhesive beads 120 has occurred continuously, that is, whether or not, from visible inspection through the barrier sheet, an adhesive band 124 has formed at each of the adhesive bead sets 110a, 110b. Thus, by quick and easy visual inspection, the installer is able to spot any location where the adjacent adhesive beads may not have mutually merged in wet-out to each other, and in any such location re-apply overlying pressure, as for example by re-rolling thereover with the roller 122, to provide everywhere (i.e., continuous) wet-out merger between the adjacent adhesive beads. However, even if for some reason wet-out was not achieved by a portion of the adhesive beads, the remaining adhesive beads having wet-out will provide a water tight seal thereat.

Figure 3:
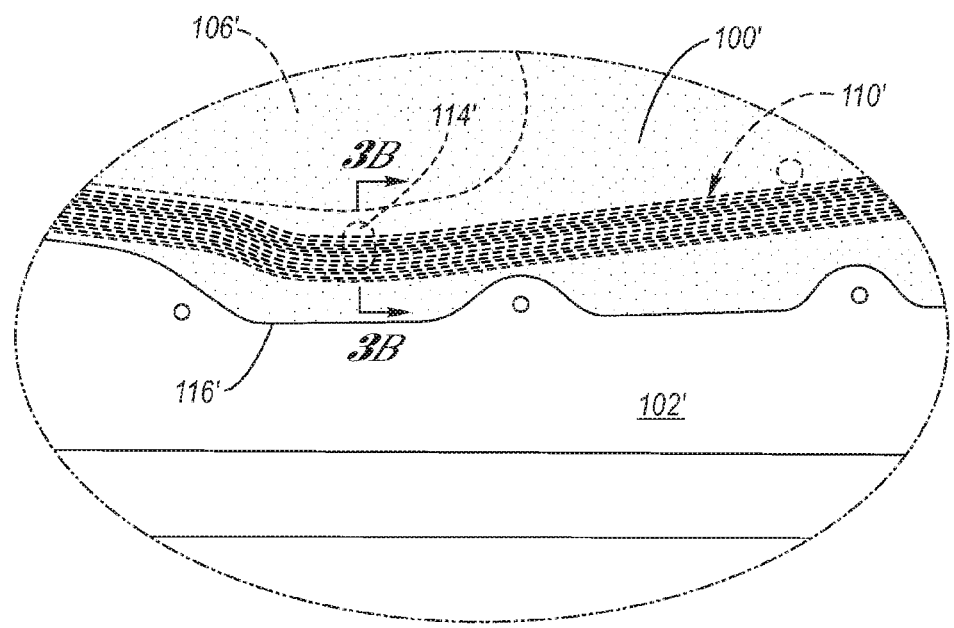
FIG. 3 is a detail side plan view of a door inside panel, showing a plurality of openings formed therein, a barrier sheet covering the openings, an adhesive bead set according to the present invention attaching the barrier sheet to the door inside panel, and showing the intersecting relation between the drain hole of the door inside panel and the adhesive bead set according to the present invention.
Figure 3A:
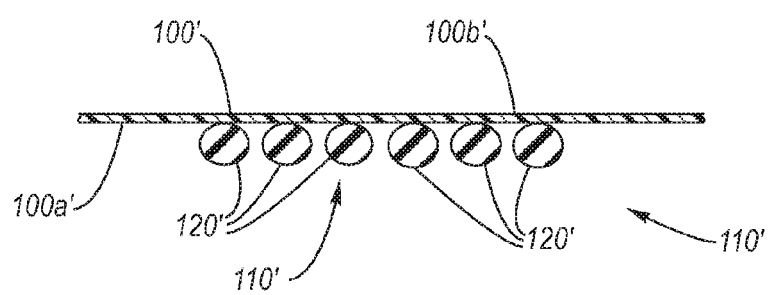
FIG. 3A is a cross-sectional view of a barrier sheet having an adhesive bead set attached thereto, ready for installation onto an inside door panel without a door panel trough.
Figure 3B:
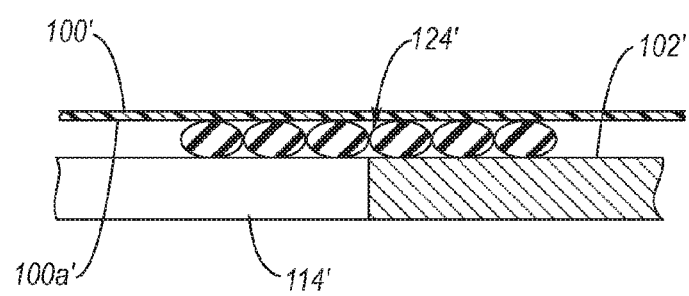
FIG. 3B is a cross-sectional view, seen along line 3B-3B of FIG. 3.

Referring next to FIGS. 3 through 3B, an alternative embodiment of the barrier sheet 100' is depicted which is intended for installation on an inside door panel 102' having no door panel trough, but having at least one opening 106' and having an intersecting drain opening 114'. In this case, a single bead set 110' is provided on the application face 100a' of the barrier sheet 100' as shown by way of example at FIG. 3A disposed inside and proximate to the perimeter 116' of the barrier sheet 100', although bead sets 110a, 110b of FIG. 2C could be used, as well.

In this exemplification, the adhesive beads 120', are as described above, being arranged in mutually parallel relation to each other, and mutually spaced apart a predetermined distance such that when an installer applies pressure to the outer face 100b' of the barrier sheet 100', pressing upon the adhesive beads 120', as for example via the above mentioned roller, the adhesive beads wet-out, they expand toward each other and wet-out with respect to each other (see FIG. 3B), thereby forming an adhesive band 124', which is also wet-out on the inside door panel 102'.

Figure 4:
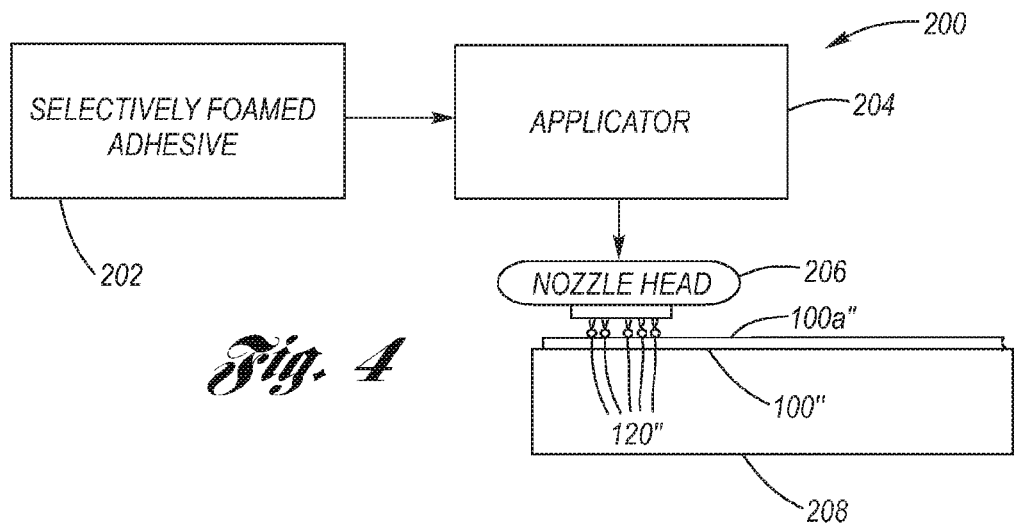
FIG. 4 is a schematic representation of an application process for applying one or more adhesive bead sets to a barrier sheet according to the method of the present invention.

Turning attention now to FIG. 4, a schematic representation of an applicator apparatus 200 is depicted. A tank of selectively foamed adhesive 202 is provided, wherein the foam is delivered to an applicator component 204 having a nozzle head 206 capable of squeezingly applying multiple adhesive beads 120" onto the application side 100a" of a barrier sheet 100" which is lying upon a table 208.

EXAMPLE I

An example of an applicator apparatus, as for example applicator apparatus 200 of FIG. 4 is as follows. The selectively foamed adhesive 202 is a hot melt high performance polymer adhesive (for example Bostik H2999 adhesive of Example II) in the form of a between 0% and about 50% foam by gas addition, preferably nitrogen, or equivalent, wherein if gas addition is 0%, then the adhesive is unfoamed. The Applicator 204 is a Nordson FoamMelt® model 200 of Nordson Corporation of Duluth, Ga. 30097, or equivalent. The nozzle head 206 is a Nordson Series H-200 "Mini-Bead" gun, utilizing nozzle part 169932, of Nordson Corporation, or equivalent.

EXAMPLE II

An example of a suitable barrier sheet having at least one set of adhesive beads, as for example as depicted at FIGS. 2 and 2C is as follows. The barrier sheet 100 is composed of a flexible transparent (for installer feedback) or opaque highly filled polymer sheet. Each adhesive bead 120 of each of the adhesive bead sets 110a, 110b is composed of a hot melt high performance rubber based adhesive, as for example Bostik H2999 adhesive available from Bostik, Inc. of Wauwatosa, Wis. 53226, or equivalent. Each adhesive bead has a diameter of about 2 mm, with a separation distance D therebetween of between about 1.0 mm and 1.5 mm.

Figure 5:
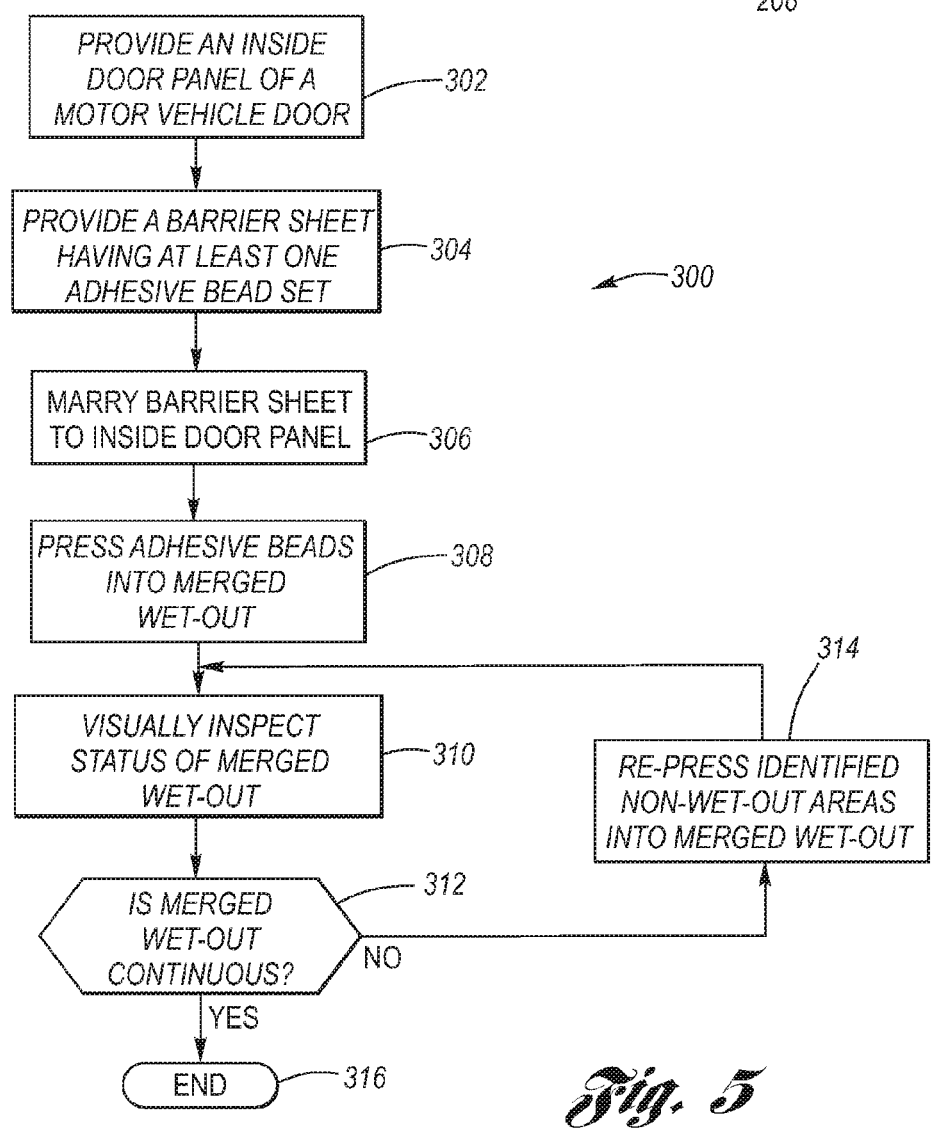
FIG. 5 is a flow chart depicting an example of steps for carrying out the present invention.

FIG. 5 is an exemplar flow chart 300 of an example of steps for carrying out a methodology according to the present invention.

At Block 302, a motor vehicle door is provided with an inside door panel having at least one opening and may have a door trough. At Block 304, a barrier sheet is provided having at least one adhesive bead set, each bead set having a plurality of adhesive beads. At Block 306, the barrier sheet is married to the inside door panel, wherein the barrier sheet is aligned with the inside door panel, and the adhesive beads pressed sufficiently to hold the barrier sheet in place. At Block 308, a roller is rolled over the at least one adhesive bead set to thereby cause the adhesive beads of each adhesive bead set to mergingly wet-out adjacently into each other to form an adhesive band, and to generally simultaneously wet-out onto the inside door panel.

At Block 310, the installer visually inspects the status of the merged wet-out of the beads by looking through the barrier sheet and seeing that the merged wet-out is continuous, in other words, that the adhesive band is continuous. At Decision Block 312, inquiry is made whether or not the inspection revealed any areas where the merged wet-out was not continuous (i.e, a non-merged wet-out area), in other words, whether inspection revealed any areas where the adhesive band was not continuous.

If the answer to the inquiry at Decision Block 312 is yes, then the installer executes Block 314, whereat he/she re-rolls those identified areas and then again visually inspects at Block 310, repeating these steps until the answer to the inquiry at Decision Block 312 is no, whereupon the barrier sheet installation has ended at Block 316.

It will be understood that while it is preferred for the plurality adhesive beads to be applied simulataneously to the barrier sheet, this is not a requirement.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A motor vehicle door comprising:
  an inside door panel having at least one opening formed therein;
  a barrier sheet having a perimeter configured to coveringly overlap at least one opening formed in the inside door panel;
  at least one adhesive bead set adhesively attaching said barrier sheet to said inside door panel, wherein each adhesive bead set comprises:
    a plurality of adhesive beads, each adhesive bead being disposed in parallel relationship to each and in locally parallel relation to the perimeter;
    wherein the adhesive beads are preselected and mutually spaced so that adjacent adhesive beads are mutually initially separated then wet-out with respect to each other and to said inside door panel when pressure is applied to said barrier sheet toward said inside door panel;
  a door panel trough formed in said inside door panel, said door panel trough having a predetermined path including at least one gravitationally low point; and
  at least one drain hole formed in said inside door panel intersecting said door panel trough, a drain hole of said at least one drain hole being disposed at each said gravitationally low point, respectively;
  wherein said at least one adhesive bead set comprises:
    an inside adhesive bead set located adjacent one side of said door panel trough; and
    an outside adhesive bead set located adjacent the other side of said door panel trough, wherein said outside bead set is located closer to said periphery than is said inside adhesive bead set;
  wherein said inside adhesive bead set intersects said at least one drain hole.

2. The motor vehicle door of claim 1, wherein prior to the wet-out, the adhesive beads of each adhesive bead set comprise each adhesive bead having a cross-sectional diameter of about 2 mm, and each adjacent adhesive bead being mutually initially separated between about 1.0 mm and 1.5 mm.

3. The motor vehicle door of claim 2, wherein each said adhesive bead comprises a hot melt high performance rubber based adhesive.

4. The motor vehicle door of claim 1, wherein the wet-out of the adjacent adhesive beads comprises a merged wet-out of the adhesive beads of each of said inside and outside adhesive bead sets, each said merged wet-out comprising, respectively, an adhesive band.

5. The motor vehicle door of claim 4, wherein prior to the wet-out, the adhesive beads of each of said inside and outside adhesive bead sets comprise each adhesive bead having a cross-sectional diameter of about 2 mm, and each adjacent adhesive bead being mutually initially separated between about 1.0 mm and 1.5 mm.

6. The motor vehicle door of claim 5, wherein:
  said inside adhesive bead set comprises two adhesive beads; and
  said outside adhesive bead set comprises three adhesive beads.

7. The motor vehicle door of claim 6, wherein at least one adhesive bead of said outside adhesive bead set intersects said at least one drain hole.

8. The motor vehicle door of claim 7, wherein each said adhesive bead comprises a hot melt high performance rubber based adhesive.

9. A method for providing a barrier sheet for selectively covering an inside door panel of a motor vehicle door, comprising the steps of:
  providing a barrier sheet having a predetermined perimeter for selectively covering a predetermined inside door panel of a motor vehicle door;
  applying a plurality of adhesive beads to an application face of the barrier sheet, said plurality of adhesive beads comprising at least one adhesive bead set, wherein each adhesive bead set comprises a plurality of mutually parallel and mutually spaced apart adhesive beads, the beads being disposed in substantially parallel relation to the perimeter;
  placing the application face of the barrier sheet against the inside door panel;
  pressing upon the barrier sheet toward the inside door panel to thereby cause the adhesive beads to wet-out with respect to the inside door panel;
  visually inspecting through the barrier sheet continuity of the merged wet-out of the adhesive band formed of each adhesive bead set in response to said step of pressing;

identifying, in response to said step of inspecting, whether any area of the adhesive beads of each said adhesive bead set lacks merged wet-out continuity; and re-pressing upon the barrier sheet toward the door inside panel any area identified in said step of identifying;

wherein in said step of applying, the adhesive beads of each adhesive bead set has a predetermined spacing between adjacent adhesive beads thereof such that during said step of pressing, the adjacent adhesive beads mergingly wet-out with respect to each other to thereby collectively form an adhesive band.

10. The method of claim 9, wherein said step of applying comprises:

providing an adhesive;

selectively foaming the adhesive by between a trace and about 50 percent gas addition; and applying the adhesive beads to the application surface by squeezing the foamed adhesive through at least one nozzle.

11. The method of claim 10, wherein in said step of applying, each adhesive bead has a cross-sectional diameter of about 2 mm and adjacent adhesive beads are mutually separated by a distance of between about 1.0 mm and 1.5 mm.

12. The method of claim 9, wherein said step of applying comprises:

providing a hot melt high performance rubber based adhesive;

selectively foaming the adhesive by between a trace and up to about 50 percent gas addition; and applying the adhesive beads to the application surface by squeezing the foamed adhesive through at least one nozzle.

13. The method of claim 9, wherein in said step of applying, said at least one adhesive bead set comprises:

an inside adhesive bead set; and an outside adhesive bead set;

wherein in said step of placing, the inside and outside adhesive bead sets mutually straddle a door panel trough of the inside door panel.

14. The method of claim 13, wherein in said step of applying, said inside adhesive bead set comprises two adhesive beads; and said outside adhesive bead set comprises three adhesive beads.

15. The method of claim 13, wherein in said step of applying, at least one of said inside and outside bead sets intersects at least one drain hole of the door panel.

* * * * *